United States Patent
Kudaravalli et al.

(10) Patent No.: US 9,821,425 B2
(45) Date of Patent: Nov. 21, 2017

(54) DEVICE FOR SUPPLYING SUBCOOLED LIQUID CRYOGEN TO CUTTING TOOLS

(71) Applicant: 5ME IP, LLC, Cincinnati, OH (US)

(72) Inventors: Ravikumar Kudaravalli, Shelby Township, MI (US); George Georgiou, Tecumseh (CA)

(73) Assignee: 5ME IP, LLC, Cincinnati, OH (US)

(*) Notice: Subject to any disclaimer, the term of this patent is extended or adjusted under 35 U.S.C. 154(b) by 279 days.

(21) Appl. No.: 14/636,947

(22) Filed: Mar. 3, 2015

(65) Prior Publication Data

US 2015/0251288 A1 Sep. 10, 2015

Related U.S. Application Data

(60) Provisional application No. 61/948,224, filed on Mar. 5, 2014.

(51) Int. Cl.
*F17C 7/00* (2006.01)
*F17C 9/00* (2006.01)
(Continued)

(52) U.S. Cl.
CPC .......... *B23Q 11/1053* (2013.01); *F17C 9/00* (2013.01); *F17C 13/026* (2013.01); *F25D 3/10* (2013.01);
(Continued)

(58) Field of Classification Search
CPC ...... F17C 2227/0306; F17C 2227/0339; F17C 2227/0374; F17C 2223/0146;
(Continued)

(56) References Cited

U.S. PATENT DOCUMENTS 2,632,302 A   3/1953  Steele
2,983,105 A * 5/1961  Armond ............... F17C 3/02
                                                    62/386

(Continued)

FOREIGN PATENT DOCUMENTS

EP   0158395 B1   9/1987
EP   0589562 A1   3/1994
(Continued)

OTHER PUBLICATIONS

European Search Report for EP Application No. 15157421.7 mailed from the European Patent Office dated Jul. 24, 2015. 10 pages.

*Primary Examiner* — Frantz Jules
*Assistant Examiner* — Erik Mendoza-Wilkenfel
(74) *Attorney, Agent, or Firm* — Reising Ethington P.C.

(57) ABSTRACT

A method for subcooling liquid cryogen that is used by a cutting tool uses the steps of dividing liquid phase cryogen between a subcooler feed line and tool feed line. The cryogen in the subcooler feed line is expanded to lower the pressure and decrease the temperature of the cryogen, and the expanded liquid cryogen from the subcooler feed line is added to the interior of a subcooler. A heat exchanger is positioned in the subcooler in contact with the expanded liquid cryogen. The cryogen in the tool feed line is subcooled below its saturation temperature by passing the cryogen through the heat exchanger, and the subcooled cryogen from the heat exchanger is supplied to the cutting tool. As a result, the subcooled cryogen supplied to the cutting tool is substantially 100% liquid cryogen without any vapor content.

17 Claims, 3 Drawing Sheets

(51) Int. Cl.
*F28D 7/04* (2006.01)
*B23B 27/10* (2006.01)
*B23B 51/06* (2006.01)
*B23Q 11/10* (2006.01)
*F17C 13/02* (2006.01)
*F25D 3/10* (2006.01)

(52) U.S. Cl.
CPC .. *B23Q 11/1061* (2013.01); *F17C 2205/0332* (2013.01); *F17C 2205/0335* (2013.01); *F17C 2221/013* (2013.01); *F17C 2221/014* (2013.01); *F17C 2221/016* (2013.01); *F17C 2221/017* (2013.01); *F17C 2223/0161* (2013.01); *F17C 2223/033* (2013.01); *F17C 2223/046* (2013.01); *F17C 2225/0161* (2013.01); *F17C 2225/0169* (2013.01); *F17C 2225/033* (2013.01); *F17C 2227/0339* (2013.01); *F17C 2227/0374* (2013.01); *F17C 2265/017* (2013.01); *F17C 2270/0545* (2013.01); *F25B 2400/23* (2013.01); *Y10T 407/14* (2015.01); *Y10T 408/03* (2015.01); *Y10T 409/304088* (2015.01)

(58) Field of Classification Search
CPC ...... F17C 2223/0161; F17C 2225/0169; F17C 2225/0339; F17C 2225/0626; F17C 2225/0545; F17C 7/00; F17C 9/00; F28D 1/0206; F28D 7/04; B23B 27/10; B23B 51/06; B23D 77/006; F25B 40/02
See application file for complete search history.

(56) References Cited

U.S. PATENT DOCUMENTS

| | | | | |
|---|---|---|---|---|
| 3,938,347 | A * | 2/1976 | Riedel | F16C 13/02 |
| | | | | 137/392 |
| 3,962,881 | A * | 6/1976 | Muska | F17C 9/04 |
| | | | | 62/121 |
| 4,296,610 | A | 10/1981 | Davis | |
| 4,510,760 | A * | 4/1985 | Wieland | F17C 13/00 |
| | | | | 137/398 |
| 5,592,863 | A | 1/1997 | Jaskowiak et al. | |
| 2002/0189413 | A1 | 12/2002 | Zurecki et al. | |
| 2010/0272529 | A1 | 10/2010 | Rozzi et al. | |
| 2012/0186053 | A1* | 7/2012 | Meidar | B23Q 11/1053 |
| | | | | 29/39 |
| 2013/0177363 | A1 | 7/2013 | Meidar et al. | |

FOREIGN PATENT DOCUMENTS

| | | |
|---|---|---|
| EP | 0744577 A2 | 11/1996 |
| EP | 2347855 A1 | 7/2011 |
| WO | 2013030006 A1 | 3/2013 |

* cited by examiner

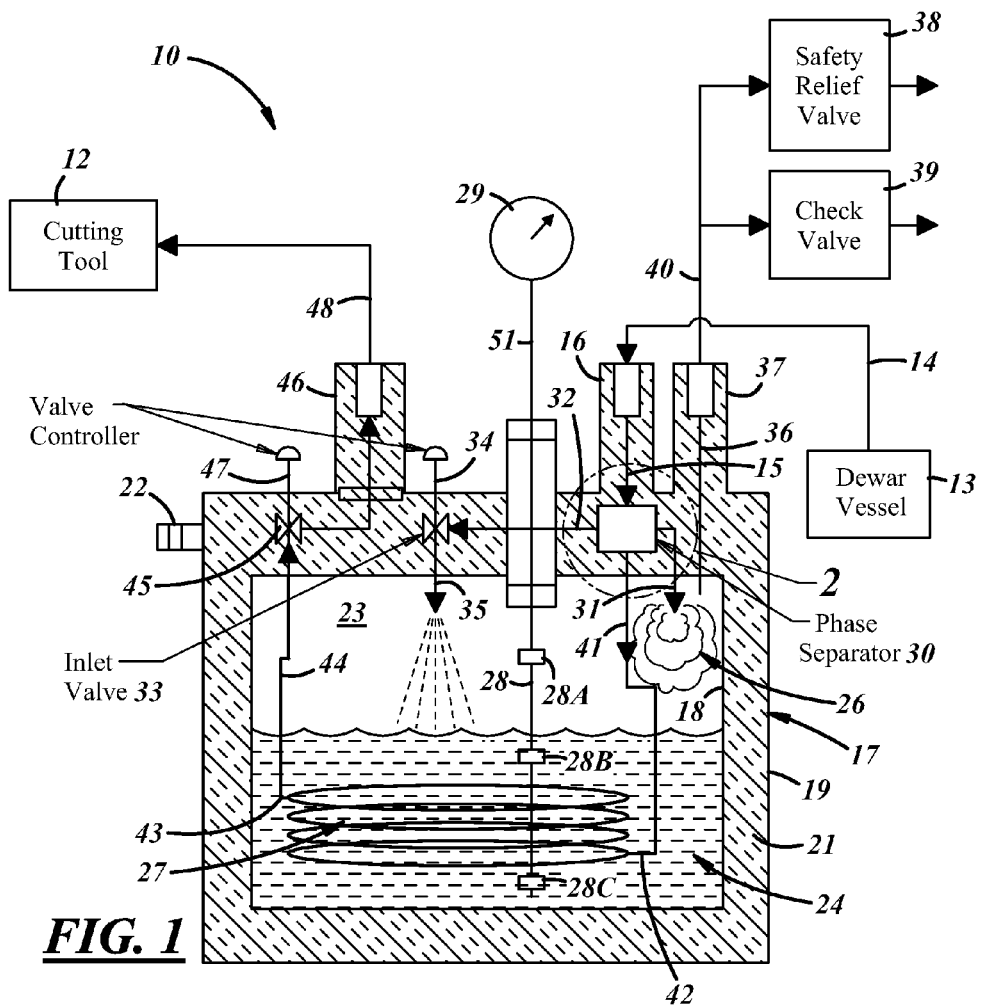
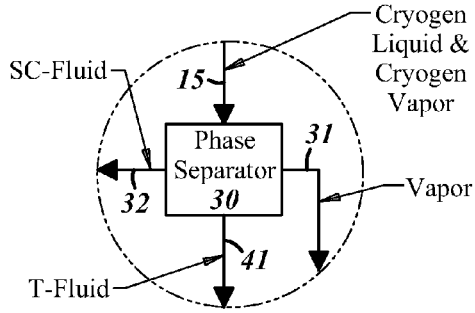
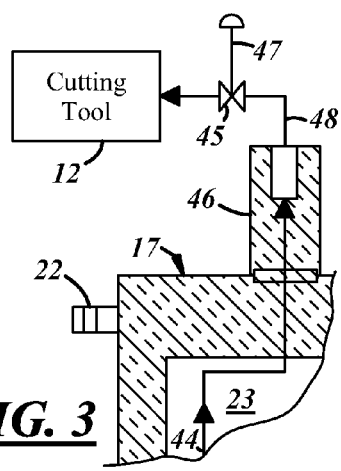

DEVICE FOR SUPPLYING SUBCOOLED LIQUID CRYOGEN TO CUTTING TOOLS

PRIORITY

This application claims the benefit of U.S. Provisional Application 61/948,224 filed on Mar. 5, 2014, the entire disclosure of which is incorporated herein by reference.

FIELD

This device relates to a subcooler for cryogenic coolant used to cool cutting tools which ensures that the cryogenic coolant supplied to the cutting tool is 100% liquid quality.

BACKGROUND

Performance of cutting tools and cutting tool life is favorably increased when cutting tools are maintained at lower than ambient temperature during machining. Cryogenic fluids can be used to achieve this result. Cryogenic fluids are commonly stored in cryogenic tanks (Dewar vessels) at elevated pressures as a saturated liquid. When the saturated liquid is transported to the cutting tool, generally via vacuum jacketed piping that may be flexible or rigid, or a combination of flexible and rigid, some of the liquid will change to vapor, resulting in a two phase flow. The vapor is generally referred to as flash, referring to the conversion of the liquid cryogen into vapor. The factors that cause flash are pressure drops, heat leaking into the system, and combinations of these factors. It is difficult to control the flow rate of two phase cryogenic fluid, i.e., liquid mixed with vapor or flash, without having pulsing and hesitations in the flow that can be damaging to tools. This is especially true when the flow rate is low, such as the flow rate that is required for cooling cutting tools.

The performance of cutting tools and cutting performance will be higher if the vapor content of the cryogenic fluid supplied is lower. Cryogen that is 100% liquid quality means that there is no vapor in the supplied fluid. Cryogen that is 100% liquid quality or near 100% is required for maximum efficiency when using cryogen to cool cutting tools. In order to keep the cryogen in its liquid state for as long as possible until the point of delivery at the cutting tool where it will provide the most effective cooling, the cryogen needs to be subcooled.

BRIEF DESCRIPTION OF THE DRAWINGS

FIG. 1 is a schematic representation of a device for the delivery of subcooled cryogen to a cutting tool.

FIG. 2 is a partial view of the portion of FIG. 1 designated by the circle 2 surrounding the phase separator 30.

FIG. 3 shows the outlet valve for the subcooler positioned next to the cutting tool.

DESCRIPTION OF THE PREFERRED EMBODIMENT

Figure 5:
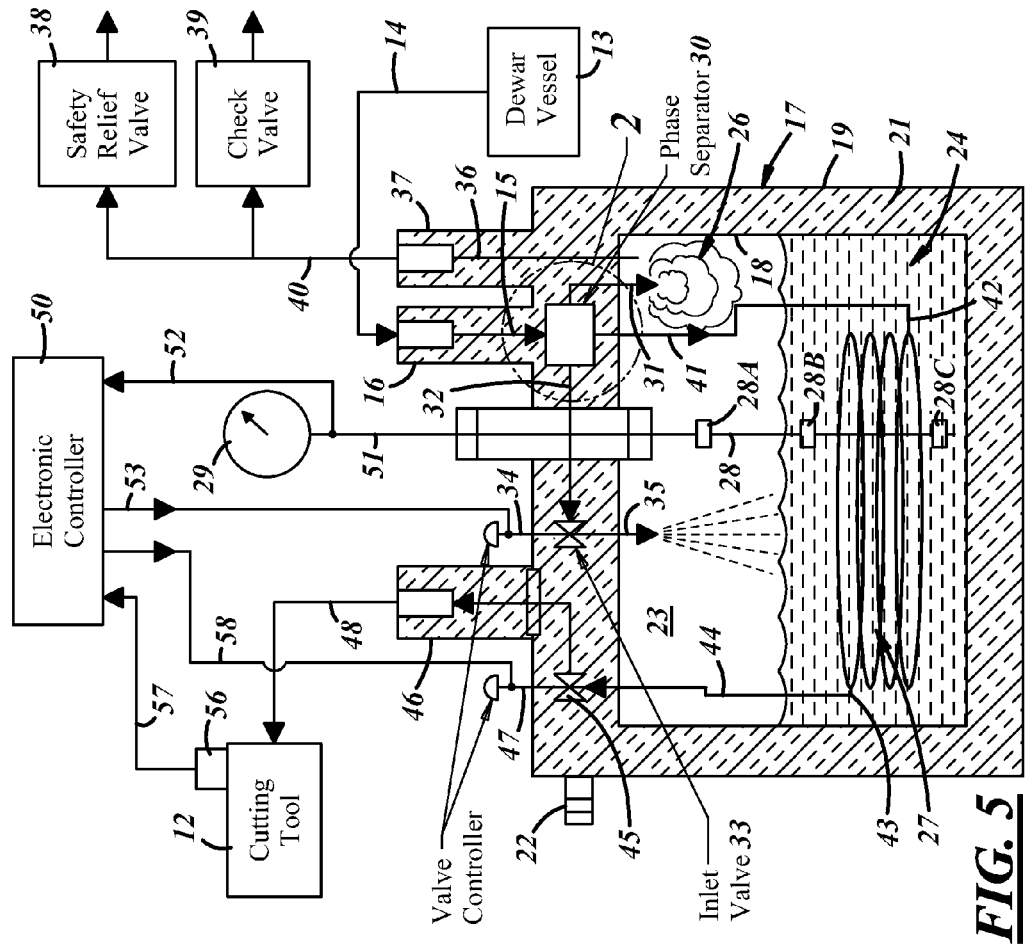
FIG. 5 shows an electronic controller used to control valves in the subcooler cooling system.

Turning now to the drawing figures, FIG. 1 is a schematic representation of a device 10 for the delivery of subcooled cryogen to a cutting tool 12. The device ensures that the cryogenic fluid that is delivered to the cutting tool 12 is 100% liquid, or substantially 100% liquid, and in a subcooled state, i.e. below the saturation temperature for the cryogen corresponding to the prevailing pressure.

Cryogenic fluid may be supplied from a Dewar vessel 13. The cryogenic fluid may be liquid nitrogen, liquid helium, liquid argon, liquid carbon dioxide, or any other industrial cryogenic fluid. In the device described herein, liquid nitrogen was used. The cryogen from the Dewar vessel 13 may be coupled by an inlet line 14 to an inlet port 16 on a subcooler 17. The inlet line 14 may be a thermally insulated, flexible, vacuum jacketed line of the type normally used to convey cryogenic fluids, and the inlet port 16 may be fitted with a bayonet type fitting or a screw type fitting or any other type of fitting known to those skilled in the art.

The subcooler 17 may comprise in an inside wall 18 and an outside wall 19, and an insulating space 21 may be formed between the two walls 18 and 19. The insulating space 21 may be filled with a multi-layer insulating material and may also be evacuated, or other types of insulation that may be used with cryogenic fluids may also be employed. A vacuum port and safety device 22 may be mounted on the outside wall 19 of the subcooler 17. The vacuum port and safety device 22 may be used to evacuate the space 21 between the inside wall 18 and the outside wall 19 of the subcooler. The interior 23 of the subcooler may contain liquid cryogen 24 and cryogen vapor 26. A heat exchanger 27 may be submerged in the liquid cryogen 24, and a liquid level sensing device 28 for sensing the level of liquid cryogen 24 in the subcooler 17 may be provided. The liquid level sensing device 28 may include a high level sensor 28A, a low level sensor 28B, and an alarm level sensor 28C. The liquid level sensing device 28 may be coupled by a first signal line 51 to a liquid level indicator 29 positioned outside of the subcooler 17. The heat exchanger 27 is positioned below the low level sensor 28B, and may be a plate type heat exchanger or a coil type heat exchanger, or any other type of heat exchanger that may be used in a laboratory or industrial application.

As shown in FIG. 1 and in detail in FIG. 2, the inlet port 16 on the subcooler 17 may be coupled by a phase separator feed line 15 to a phase separator 30 where liquid cryogen and cryogen vapor from the inlet line 14 are separated. The phase separator 30 is located in the space 21 between the inside wall 18 and the outside wall 19 of the subcooler 17. Vapor from the phase separator 30 may be vented via the vapor inlet line 31 to interior 23 of the subcooler 17. Liquid cryogen from the phase separator is divided between a subcooler feed line 32 and a tool feed line 41. A major fraction of the liquid cryogen from the phase separator 30, referred as T-Fluid (fluid that is delivered to the tool 12), passes through the tool feed line 41 and is sent to cool the cutting tool 12 after passing through the heat exchanger 27 where it will be subcooled by exchanging heat with liquid cryogen 24. A minor fraction of the liquid cryogen from the phase separator 30, referred as SC-Fluid (cryogenic fluid that used in the subcooler 17 to subcool the T-fluid), is sent via the subcooler feed line 32 to an inlet valve 33.

The inlet valve 33 may comprise an expansion valve, or a capillary tube, or an orifice, or any other type of control device which results in an expansion of the fluid coming from the subcooler feed line 32. Passing the SC-Fluid through the inlet valve 33 expands the fluid and lowers its pressure, thereby producing lower temperature liquid cryogen 24 which is used to subcool the T-Fluid in the heat exchanger 27. The subcooled SC-fluid from the inlet valve 33 flows through the SC-fluid inlet 35 and is added to the liquid cryogen in the subcooler 17. The flow of cryogen through the inlet valve 33 to replenish liquid cryogen 24 in the subcooler 17 may be controlled by an inlet valve controller 34 by monitoring the level of cryogen using the liquid level sensing device 28. Cryogen vapor 26 in the subcooler may be vented from the interior 23 of the subcooler 17 through a vapor outlet line 36 that is coupled to a vent port 37. The vent port 37 may be coupled by an exhaust line 40 to a safety relief valve 38 and to a check valve 39, both of which are vented to atmosphere.

T-Fluid, or cryogenic fluid that is supplied from the phase separator 30 to the cutting tool 12, is routed through a tool feed line 41 to an inlet 42 on the heat exchanger 27 that is submerged in the liquid cryogen 24 in the subcooler 17. An outlet 43 from the heat exchanger 27 is coupled by a heat exchanger outlet line 44 to an outlet valve 45 that is coupled to an outlet port 46. The outlet port 46 may be fitted with a bayonet type fitting or a screw type fitting or any other type of fitting known to those skilled in the art. Cryogen from the outlet port 46 may be coupled to a coolant outlet line 48 that may be coupled to the cutting tool 12. The flow rate of the T-Fluid through the coolant outlet line 48 will be controlled by the outlet valve 45 and an outlet valve controller 47. The coolant outlet line 48 may be a thermally insulated, flexible, vacuum jacketed line of the type normally used to convey cryogenic fluids.

In operation, although a thermally insulated line 14 may be used to couple the Dewar vessel 13 to the inlet port 16 of the subcooler 17, the pressure drop and the inevitable heat leaks along the length of the insulated inlet line 14 cause a two phase flow in the cryogenic fluid that is delivered to the inlet port 16. In order to convert the cryogen from the Dewar vessel 13 to a pure liquid at a subcooled temperature at the outlet port 46 of the subcooler 17, the SC-Fluid that is delivered to the interior 23 of the subcooler 17 is first brought to a lower temperature and pressure through the use of the inlet valve 33. The lower temperature SC-Fluid flows from the inlet valve 33 through the SC-fluid inlet 35 and is added to the liquid cryogen 24 in the subcooler 17 which surrounds the heat exchanger 27. The T-Fluid in the tool feed line 41 from the phase separator 30 is subcooled by passing it through the heat exchanger 27.

As a result, the cryogen in the tool feed line 41, which is initially at a higher temperature and pressure when it enters the subcooler 17, is cooled below its saturation temperature at the prevailing pressure by passing through the heat exchanger 27 in the subcooler. Positioning the heat exchanger 27 below the low level sensor 28B ensures that the heat exchanger will always be in contact with liquid cryogen 24 in the subcooler 17 and will thus be able to cool the T-fluid in the tool feed line 41. The subcooled T-Fluid flows out of the subcooler 17 through the outlet valve 45 that is controlled by an outlet valve controller 47 for delivery through the coolant outlet line 48 to the cutting tool 12. The subcooled cryogen that is delivered to the cutting tool 12 is substantially 100% liquid cryogen without any vapor content. Maintaining a supply of subcooled liquid cryogen through the outlet valve 45 to the cutting tool 12 instead of a mixture of liquid and vapor cryogen enables accurate and continuous control of the flow rate through the outlet valve 45 to the cutting tool 12 which is essential for optimum cutting tool operation and performance.

Depending on the requirements of the application, the outlet valve 45 may be integrated into subcooler 17 as shown in FIG. 1 or it may be located outside of the subcooler 17, as close as possible to the to the point of use of the cutting tool 12, as shown in FIG. 3. This arrangement would be used if the pressure drop in the coolant outlet line 48 and the outlet valve 45 is high enough to negate the benefits of subcooling, and results in two phase flow conditions which adversely affect the pressure drop in the coolant outlet line 48. In such situations, it is desirable to locate the outlet valve 45 as close as possible to the point of use.

Figure 4:
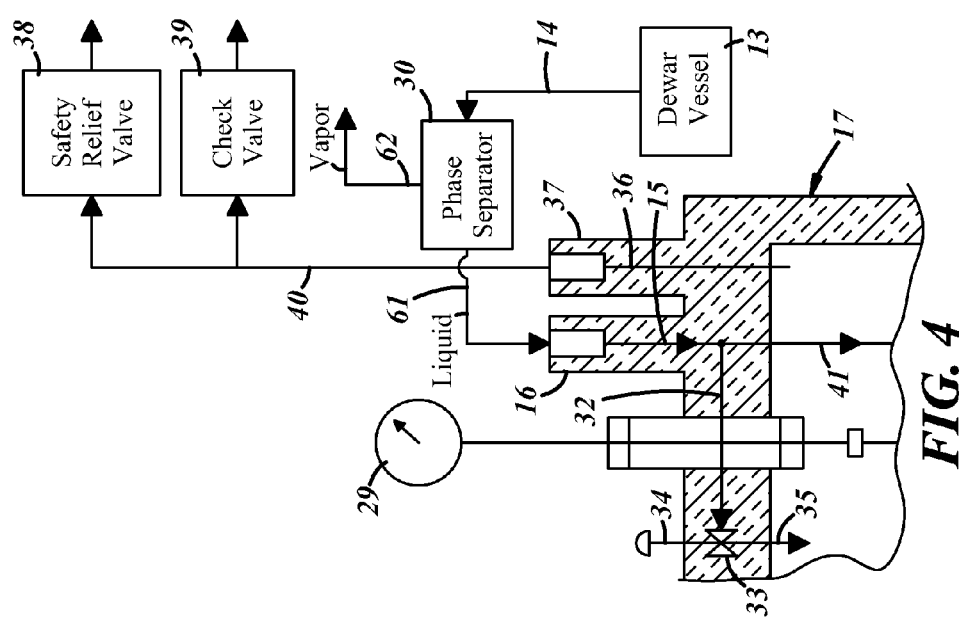
FIG. 4 shows the phase separator for the subcooler positioned outside of the subcooler housing.

In order to provide a compact construction, the phase separator 30 may be positioned as shown in FIG. 1, in the space 21 between the inside and outside walls 18 and 19, respectfully, of the subcooler 17. In an alternate construction as shown in FIG. 4, the phase separator 30 may be positioned outside of the subcooler 17, connected to the inlet line 14 from the Dewar vessel 13. Liquid from the outlet 61 of the phase separator 30 may be coupled to the inlet port 16 of the subcooler 17, and vapor from the phase separator 30 may be vented through a vapor outlet 62 to atmosphere.

As shown in FIG. 5, an electronic controller 50 may be used to control the operation of the inlet valve controller 34 and the outlet valve controller 47, respectively, that are coupled to the inlet valve 33 and the outlet valve 45, respectively. The electronic controller may be a Programmable Linear Controller (PLC) as is well known in the art. The signal on the first signal line 51 from the liquid level sensing device 28 may be coupled by a second signal line 52 to the electronic controller 50. The electronic controller 50 determines the level of liquid cryogen 24 in the interior 23 of the subcooler 17. If the level of cryogen is low as sensed by the low level sensor 28B, the controller 50 sends a signal on a first control line 53 to the inlet valve controller 34 to open the inlet valve 33 in order to allow more cryogen to flow into the subcooler 17. When the cryogen in the subcooler 17 is at a maximum level as sensed by the high level sensor 28A, a signal is sent to the controller 50 on the lines 51 and 52, and the controller 50 sends a signal on the first control line 53 to close the inlet valve 33 and terminate the flow of cryogen into the subcooler 17. When the cryogen in the subcooler 17 is at a dangerously low level as sensed by the alarm level sensor 28C, a signal is sent to the controller 50 on the lines 51 and 52 and the controller 50 will shut the system off.

A rotation sensor 56 may be coupled to the cutting tool 12 to sense when the cutting tool 12 is rotating. A signal from the rotation sensor 56 may be coupled by a third signal line 57 to the electronic controller 50. The electronic controller 50 may be used to send a signal on the second control line 58 to the outlet valve controller 47 to open the outlet valve 45 only when the cutting tool 12 is rotating, and to close the outlet valve 45 when the cutting tool is not rotating. Using this arrangement, the electronic controller 50 may be used to automatically turn on the flow of cryogenic coolant to the cutting tool 12 only when the cutting tool 12 is rotating, and turn off the flow of cryogen when the cutting tool 12 is not rotating, thus making the most efficient use of cryogen by the system.

Figure 6:
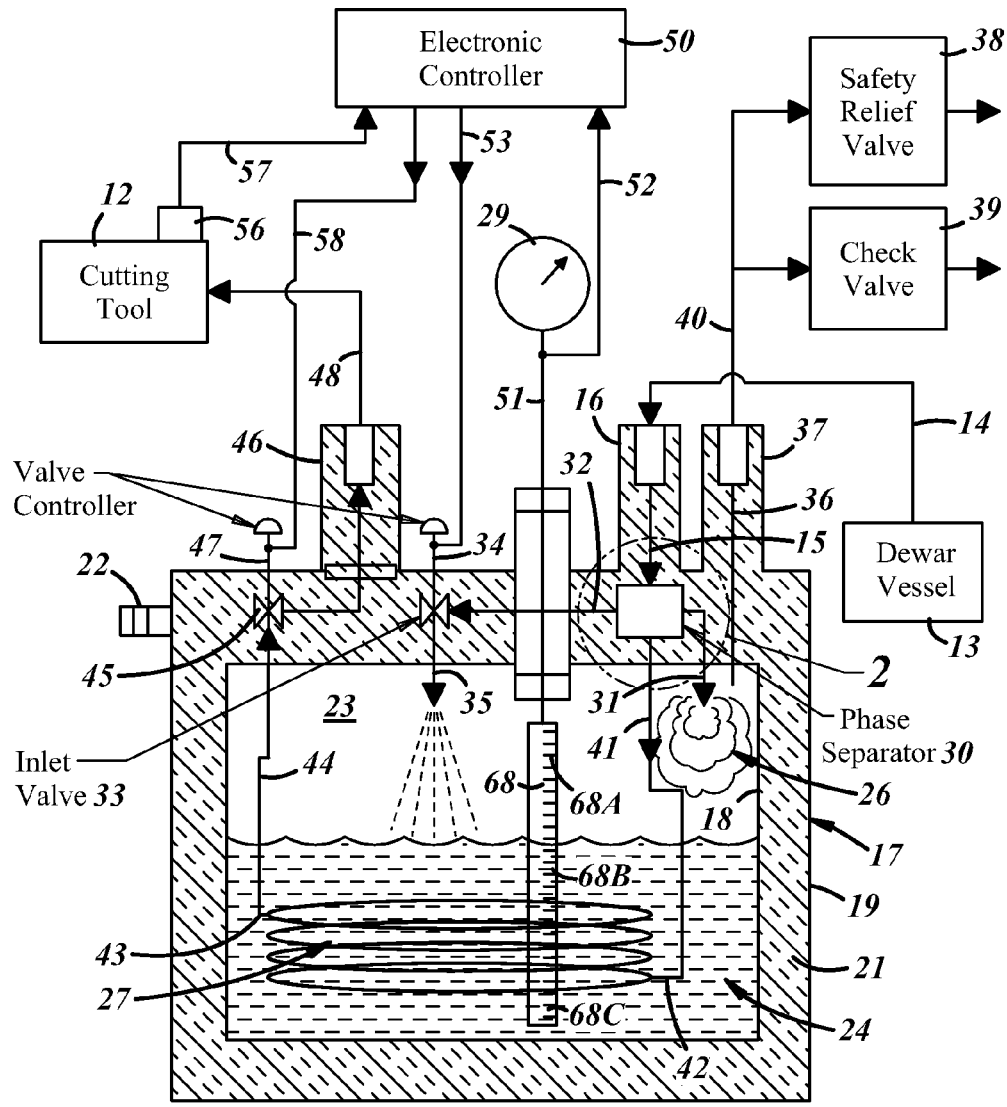
FIG. 6 shows a liquid level sensing device that measures liquid levels continuously along its length.

FIG. 6 shows a liquid level sensing device 68 that measures liquid levels continuously along its length, such as, for example, a differential pressure level sensor, a capacitance level sensor, a resistance level sensor or an ultrasound level sensor. In such an arrangement, the reference numerals 68A, 68B, and 68C do not represent individual sensors, but levels of cryogen in the subcooler 17 that a controller such as PLC is monitoring to take action. For example, 68A may represent a desired maximum level of cryogen in the subcooler 17, 68B may represent a desired minimum level of cryogen, and 68C may represent a level of cryogen at which an alarm is generated. The liquid level sensing device 68 is able to send signals to the liquid level indicator 29 and the electronic controller 50 for levels of liquid cryogen 24 that are within its calibrated range, and the liquid level indicator 29 and the electronic controller 50 will use the signals to provide an appropriate display and to manage the operation of the system as appropriate.

Except for the substitution in FIG. 6 of the continuously measuring liquid level sensor 68 for the sensor 28 shown in FIG. 5, the components of FIG. 6 are the same as those of FIG. 5, and operate in the same way except as may be described above.

Having thus described the device, various modifications and alterations will be apparent to those skilled in the art, which modifications and alterations are intended to be within the scope of the device as defined by the appended claims.

What is claimed is:

1. A method for subcooling liquid cryogen that is used by a cutting tool, the method comprising the steps of:
   supplying cryogen having a liquid phase and a vapor phase to a phase separator;
   separating liquid phase cryogen from vapor phase cryogen in the phase separator;
   feeding the liquid phase cryogen from the phase separator to a subcooler feed line and a tool feed line in a subcooler;
   expanding the cryogen in the subcooler feed line to lower the pressure and decrease the temperature of the cryogen before it is added to the interior of the subcooler;
   adding the expanded liquid cryogen from the subcooler feed line to the interior of the subcooler;
   positioning a heat exchanger in the subcooler in contact with the expanded liquid cryogen;
   subcooling the cryogen in the tool feed line below its saturation temperature by passing the cryogen through the heat exchanger; and,
   applying the subcooled cryogen from the heat exchanger to the cutting tool, whereby the subcooled cryogen supplied to the tool is liquid cryogen with minimum vapor content, and whereby the subcooled cryogen can be applied to the tool at a low flow rate without hesitations and pulsing.

2. The method of claim 1 further comprising the steps of:
   using a Dewar vessel to supply the cryogen to the phase separator.

3. The method of claim 1 further comprising the steps of:
   using an outlet valve to control the flow rate of subcooled cryogen from the heat exchanger to the tool.

4. The method of claim 1 further comprising:
   positioning the phase separator outside of the subcooler.

5. The method of claim 3 further comprising:
   positioning the outlet valve in a space between an inside wall and an outside wall of the subcooler.

6. The method of claim 3 further comprising:
   positioning the outlet valve outside of the subcooler and next to the cutting tool.

7. The method of claim 1 further comprising:
   using an orifice in the subcooler feed line to expand the cryogen.

8. The method of claim 1 further comprising:
   sensing a level of liquid cryogen in the subcooler using a liquid level sensing device that is in contact with the liquid cryogen in the subcooler;
   measuring liquid levels continuously along a length of the liquid level sensing device by using at least one of a differential pressure level sensor, a capacitance level sensor, a resistance level sensor, or an ultrasound level sensor; and,
   coupling a liquid level indicator to the liquid level sensing device using a first signal line.

9. The method of claim 8 further comprising:
   coupling the liquid level sensing device to an electronic controller using a second signal line;
   coupling a first control line between the electronic controller and an inlet valve for the subcooler; and,
   replenishing liquid cryogen in the subcooler by monitoring the level of liquid cryogen in the subcooler using the liquid level sensing device and the electronic controller and opening the inlet valve if the level of liquid cryogen in the subcooler is low.

10. The method of claim 1 further comprising:
    sensing a level of liquid cryogen in the subcooler using a liquid level sensing device that is in contact with the liquid cryogen in the subcooler;
    coupling a liquid level indicator to the liquid level sensing device using a first signal line; and,
    including a high level sensor and a low level sensor on the liquid level sensing device.

11. The method of claim 10 further comprising:
    positioning the heat exchanger in the subcooler so that is below the low level sensor.

12. The method of claim 9 further comprising:
    closing an inlet valve and terminating the flow of cryogen into the subcooler when the liquid cryogen in the subcooler is at the level of the high level sensor.

13. The method of claim 10 further comprising:
    providing an alarm level sensor on the liquid level sensing device; and,
    using an electronic controller to sound an alarm when the liquid cryogen in the subcooler is at the level of the alarm level sensor.

14. The method of claim 1 wherein the cryogen is liquid nitrogen.

15. A method for subcooling liquid cryogen that is used by a cutting tool, the method comprising the steps of:
    supplying liquid cryogen to a subcooler;
    dividing liquid cryogen between a subcooler feed line and tool feed line;
    expanding the cryogen in the subcooler feed line to lower the pressure and decrease the temperature of the cryogen;
    adding the expanded liquid cryogen from the subcooler feed line to the interior of a subcooler;
    positioning a heat exchanger in the subcooler in contact with the expanded liquid cryogen;
    subcooling the cryogen in the tool feed line below its saturation temperature by passing the cryogen through the heat exchanger;
    applying the subcooled cryogen from the heat exchanger to the cutting tool, whereby the subcooled cryogen supplied to the tool is liquid cryogen with minimum vapor content;
    supplying the cryogen from a Dewar vessel to a phase separator;
    separating vapor phase cryogen from liquid phase cryogen in the phase separator;
    supplying the liquid phase cryogen from the phase separator to the subcooler feed line and the tool feed line; and,
    positioning the phase separator in a space between an inside wall and an outside wall of the subcooler.

16. A method for subcooling liquid cryogen that is used by a cutting tool, the method comprising the steps of:
supplying liquid cryogen to a subcooler;
dividing liquid cryogen between a subcooler feed line and tool feed line;
expanding the cryogen in the subcooler feed line to lower the pressure and decrease the temperature of the cryogen;
adding the expanded liquid cryogen from the subcooler feed line to the interior of a subcooler;
positioning a heat exchanger in the subcooler in contact with the expanded liquid cryogen;
subcooling the cryogen in the tool feed line below its saturation temperature by passing the cryogen through the heat exchanger;
applying the subcooled cryogen from the heat exchanger to the cutting tool, whereby the subcooled cryogen supplied to the tool is liquid cryogen with minimum vapor content;
supplying cryogen from a Dewar vessel to a phase separator;
separating vapor phase cryogen from liquid phase cryogen in the phase separator;
supplying the liquid phase cryogen from the phase separator to the subcooler feed line and the tool feed line;
using an outlet valve to control the flow rate of subcooled cryogen from the heat exchanger to the tool; and,
using a capillary tube in the subcooler feed line to expand the cryogen.

17. A method for subcooling liquid cryogen that is used by a cutting tool, the method comprising the steps of:
supplying liquid cryogen to a subcooler;
dividing liquid cryogen between a subcooler feed line and tool feed line;
expanding the cryogen in the subcooler feed line to lower the pressure and decrease the temperature of the cryogen;
adding the expanded liquid cryogen from the subcooler feed line to the interior of a subcooler;
positioning a heat exchanger in the subcooler in contact with the expanded liquid cryogen;
subcooling the cryogen in the tool feed line below its saturation temperature by passing the cryogen through the heat exchanger;
applying the subcooled cryogen from the heat exchanger to the cutting tool, whereby the subcooled cryogen supplied to the tool is liquid cryogen with minimum vapor content;
supplying cryogen from a Dewar vessel to a phase separator;
separating vapor phase cryogen from liquid phase cryogen in the phase separator;
supplying the liquid phase cryogen from the phase separator to the subcooler feed line and the tool feed line;
using an outlet valve to control the flow rate of subcooled cryogen from the heat exchanger to the tool;
sensing a level of liquid cryogen in the subcooler using a liquid level sensing device that is in contact with the liquid cryogen in the subcooler;
coupling a liquid level indicator to the liquid level sensing device using a first signal line;
coupling a rotation sensor to the cutting tool;
coupling a third signal line between the rotation sensor and an electronic controller;
coupling a second control line between the electronic controller and the outlet valve;
opening the outlet valve using the electronic controller when the cutting tool is rotating; and,
closing the outlet valve using the electronic controller when the cutting tool is not rotating.

* * * * *